US008564518B2

(12) United States Patent
Nakahata et al.

(10) Patent No.: US 8,564,518 B2
(45) Date of Patent: Oct. 22, 2013

(54) LIQUID CRYSTAL DISPLAY DEVICE WITH DIVISIONAL-DRIVE OPERATION

(75) Inventors: Yuji Nakahata, Kanagawa (JP); Tsuyoshi Kamada, Kanagawa (JP)

(73) Assignee: Sony Corporation (JP)

( * ) Notice: Subject to any disclaimer, the term of this patent is extended or adjusted under 35 U.S.C. 154(b) by 307 days.

(21) Appl. No.: 12/737,187

(22) PCT Filed: Jun. 19, 2009

(86) PCT No.: PCT/JP2009/061184
§ 371 (c)(1), (2), (4) Date: Dec. 16, 2010

(87) PCT Pub. No.: WO2009/157380
PCT Pub. Date: Dec. 30, 2009

(65) Prior Publication Data

US 2011/0096058 A1 Apr. 28, 2011

(30) Foreign Application Priority Data

Jun. 26, 2008 (JP) ................................ P2008-167535

(51) Int. Cl.
*G09G 3/36* (2006.01)
*G02F 1/1343* (2006.01)

(52) U.S. Cl.
USPC ............................................ 345/89; 349/144

(58) Field of Classification Search
USPC .................................... 345/87–104; 349/144
See application file for complete search history.

(56) References Cited

U.S. PATENT DOCUMENTS 3,076,938 A 2/1963 Francisco
4,840,460 A 6/1989 Bernot et al.
2005/0253797 A1* 11/2005 Kamada et al. ................. 345/89
2006/0164356 A1* 7/2006 Yang et al. ....................... 345/89
2006/0176265 A1* 8/2006 Kim et al. ...................... 345/100
2006/0290626 A1* 12/2006 Arimoto et al. ................. 345/87
2007/0120799 A1* 5/2007 Tanaka et al. .................. 345/98
2007/0195041 A1* 8/2007 Lee ................................. 345/89
2008/0007574 A1* 1/2008 Yoshida et al. ............... 345/690
2008/0129673 A1* 6/2008 Kim et al. ........................ 345/89
2008/0309600 A1* 12/2008 Lee et al. ........................ 345/89

FOREIGN PATENT DOCUMENTS

JP 02-000012 A 1/1990
JP 2005-316211 A 11/2005
JP 2006-215572 A 8/2006
JP 2009-053589 A 3/2009
JP 2009-103810 A 5/2009

* cited by examiner

*Primary Examiner* — Bipin Shalwala
*Assistant Examiner* — Steven Holton
(74) *Attorney, Agent, or Firm* — Lerner, David, Littenberg, Krumholz & Mentlik, LLP

(57) ABSTRACT

A liquid crystal display device includes a plurality of pixels each including a liquid crystal element of VA mode and a drive section. The drive section space-divisionally or time-divisionally performs a display drive operation so that the operation includes first and second divisional-drive operation groups. The drive section performs an operation in the first or second divisional-drive operation group, or both thereof. In the former, the output voltage exceeds the input voltage in the intermediate luminance range, whereas in a highlight luminance range, exceeds the input voltage but shows a tendency to be lower compared to in the intermediate luminance range. In the latter, the output voltage is lower than the input voltage in the intermediate luminance range, whereas in a lowermost luminance range, equal to or lower than the input voltage but shows a tendency to be higher compared to in the intermediate luminance range.

10 Claims, 10 Drawing Sheets

LIQUID CRYSTAL DISPLAY DEVICE WITH DIVISIONAL-DRIVE OPERATION

CROSS-REFERENCES TO RELATED APPLICATIONS

The present application is a national phase entry under 35 U.S.C. § 371 of International Application No. PCT/JP2009/061184 filed Jun. 19, 2009, published on Dec. 30, 2009 as WO 2009/157380 A1, which claims priority from Japanese Patent Application No. JP 2008-167535 filed in the Japanese Patent Office on Jun. 26, 2008.

TECHNICAL FIELD

The present invention relates to a liquid crystal display device configured by a liquid crystal of a Vertical Alignment (VA) mode.

BACKGROUND ART

In recent years, for use as a display monitor of a liquid crystal television, a notebook personal computer, a car navigation system, and others, proposed is a liquid crystal display device adopting the VA (Vertical Alignment) mode using a vertically-aligned liquid crystal, for example. In this VA mode, the liquid crystal molecules are each with the negative dielectric anisotropy, that is, the molecules have the properties in which the dielectric constant in the long-axis direction thereof is lower than that in the short-axis direction thereof, thereby realizing the viewing angle wider than that with the TN (Twisted Nematic) mode.

The issue here is that such a liquid crystal display device using the VA-mode liquid crystal causes a problem of varying the luminance between when the display screen is viewed from the front direction and when it is viewed from the diagonal direction. FIG. 14 is a diagram showing the relationship between, in the liquid crystal display device using the VA-mode liquid crystal, the gray-scale (0 to 255 gray-scale levels) of a video signal and the luminance ratio (ratio to the luminance with the 255 gray-scale levels). As indicated by an arrow P101 in the drawing, the luminance characteristics show a large difference (show a variation toward a higher level of luminance) between when the display screen is viewed from the front direction))(Ys(0°)) and when it is viewed from the 45-degree direction (Ys(45°)). Such a phenomenon is referred to as "Shiratchake", namely, "Wash out", "Color Shift", and others, and is regarded as the major drawback of the liquid crystal display device using the VA-mode liquid crystal.

In consideration thereof, as measures to reduce the extent of such a phenomenon of "Wash out", proposed is the one (multi-pixel structure) with which a unit pixel is divided into a plurality of sub pixels, and the resulting sub pixels are each changed in threshold value (examples include Patent Literatures 1 to 3). The multi-pixel structure described in such Patent Literatures 1 to 3 is called HT (Halftone Gray-scale) technique based on capacity coupling, and any potential difference between two sub pixels is determined by the ratio of capacity.

FIG. 15 is a diagram showing an exemplary relationship between, in the multi-pixel structure, the gray-scale of a video signal and the display state of each of the sub pixels. The drawing shows that, in the process of a change of gray-scale level (an increase of luminance) from 0 (state of black display) to 255 (state of white display), first of all, a part (one sub pixel) of the pixel is increased in luminance, and then the remaining part (the other sub pixel) of the pixel is increased in luminance. With such a multi-pixel structure, as indicated by an arrow P102 in FIG. 14, for example, the extent of the phenomenon of "Wash out" is reduced with the luminance characteristics in the direction of 45° in the multi-pixel structure (Ym(45°)) compared with the luminance characteristics in the direction of 45° in the normal pixel structure (Ys(45°)).

Herein, not only in such a multi-pixel structure but also in the normal pixel structure, the extent of the phenomenon of "Wash out" is known to be reduced with the effects of halftone similarly to the case with the multi-pixel structure by dividing temporally a unit frame of display driving into a plurality of (e.g., two) sub frames, and also by representing any desired level of luminance with a combination of a sub frame(s) of high level of luminance and a sub frame(s) of low level of luminance.

CITATION LIST

Patent Literatures

Patent Literature 1: Japanese Unexamined Patent Publication No. 2-12

Patent Literature 2: Specification of U.S. Pat. No. 4,840,460

Patent Literature 3: Specification of Japanese Patent No. 3076938

SUMMARY OF THE INVENTION

The issue here is that such a halftone technique has the problem of easily causing the phenomenon as below. That is, first of all, as to a voltage to be applied to liquid crystal elements (liquid crystal application voltage), for transition thereof from low (e.g., gray-scale level of 0/gray-scale level of 255) to high (e.g., gray-scale level of 255/gray-scale level of 255), the halftone technique causes a steep increase of the voltage compared with the case of not using the technique. As a result, the luminance does not reach any desired value of voltage (value of luminance), thereby adversely affecting the response time of the liquid crystal. Such a phenomenon is called "variation of azimuth angle of liquid crystal", and is resulted from the abrupt application of a high voltage to the liquid crystal that has been in the state of low voltage application. Due to the voltage application as such, the liquid crystal elements are once randomly oriented at various azimuth angles, and then are all aligned at any one desired azimuth angle.

As another technique of improving the halftone response speed in the liquid crystal display device, overdriving is exemplified. This overdriving also causes a steep increase of the liquid crystal application voltage from low to high compared with the case of not using the halftone technique, and thus the response speed of the liquid crystal is indeed improved but a phenomenon called "rebounding" is easily occurred if the voltage of an original gray-scale value is applied to the liquid crystal after the completion of overdriving. This is because, due to the short-time application of a high voltage to the liquid crystal element by overdriving starting from the gray-scale level of 0 when the liquid crystal elements are in the vertical state, the liquid crystal elements in a part of the pixels are oriented differently but not those in the remaining part of the pixels.

With the above halftone technique as such, the viewing angle characteristics are indeed increased in terms of luminance but the phenomenon of variation of azimuth angle of liquid crystal or the phenomenon of rebounding is easily occurred. There thus have been problems of reducing the display characteristics of moving images, and degrading the display image quality.

The present invention is proposed in consideration of the problems as above, and an object thereof is to provide a liquid crystal display device using a VA-mode liquid crystal with which the viewing angle characteristics are improved in terms of luminance, and at the same time, the display quality can be improved better than that with a previous liquid crystal display device.

A first liquid crystal display device of the invention includes a plurality of pixels arranged in a matrix as a whole, and each provided with a liquid crystal element made of a liquid crystal of a vertical alignment (VA) mode; and a drive section driving the liquid crystal element of each of the pixels for display through applying a voltage based on an input video signal to the liquid crystal element, the drive section performing a divisional-drive operation through space-divisionally or time-divisionally dividing a display drive operation on each of the pixels into a plurality based on the input video signal. Herein, the divisional-drive operation is configured of a first divisional-drive operation group and a second divisional-drive operation group, the first divisional-drive operation group allowing a liquid crystal application voltage to be set into a higher-side voltage which is equal to or higher than an input application voltage, and a second divisional-drive operation group allowing the liquid crystal application voltage to be set into a lower-side voltage which is equal to or lower than the input application voltage, the liquid crystal application voltage representing a voltage to be applied to the liquid crystal elements, the input application voltage representing a voltage which corresponds to the input video signal. Moreover, the drive section performs a divisional-drive operation belonging to the first divisional-drive operation group in such a manner that, the liquid crystal application voltage is higher than the input application voltage at least in an intermediate luminance range, whereas the liquid crystal application voltage is, in a highlight luminance range, equal to or higher than the input application voltage but shows a tendency to be lower compared to that in the intermediate luminance range. Also, the drive section performs a divisional-drive operation belonging to the second divisional-drive operation group in such a manner that, the liquid crystal application voltage is lower than the input application voltage at least in the intermediate luminance range, whereas the liquid crystal application voltage is, in a lowermost luminance range, equal to or lower than the input application voltage but shows a tendency to be higher compared to that in the intermediate luminance range.

With the first liquid crystal display device of the invention, for the operation to drive for display the liquid crystal element in each of the pixels made of a VA-mode liquid crystal, based on the video signal, the drive operation for execution to each of the pixels is space-divisionally or time-divisionally divided into a plurality to perform an operation of multiplex driving. Therefore, compared with the case of not performing such an operation of multiplex driving, any change (change from the case when the display screen is viewed in the front direction) to the gamma characteristics (characteristics showing the relationship between the gray-scale level of luminance of the video signal and the luminance) becomes less obvious when the display screen is viewed in the diagonal direction. Further, for the operation in the first operation group of multiplex driving described above, in the highlight luminance range, the liquid crystal application voltage takes a higher-side voltage being equal to or higher than the input application voltage, and at the same time, shows a tendency to be lower compared to that in the intermediate luminance range. Therefore, compared with a previous operation of multiplex driving with which no such tendency to be low in voltage is observed in the highlight luminance range, the liquid crystal application voltage is prevented from abruptly increasing during voltage transition from low to high. Also for the operation in the second operation group of multiplex driving described above, in the lowermost luminance range, the liquid crystal application voltage takes a lower-side voltage being equal to or lower than the input application voltage, and at the same time, shows a tendency to be higher compared to that in the intermediate luminance range. Therefore, compared with the previous operation of multiplex driving with which no such tendency to be high in voltage is observed in the lowermost luminance range, during overdriving, for example, the liquid crystal application voltage is prevented from abruptly increasing from low to high.

A second liquid crystal display device of the invention includes the plurality of pixels described above, and a drive section driving the liquid crystal element of each of the pixels for display through applying a voltage based on an input video signal to the liquid crystal element, the drive section performing a divisional-drive operation through space-divisionally or time-divisionally dividing a display drive operation on each of the pixels into a plurality based on the input video signal. The divisional-drive operation is configured of the first divisional-drive operation group and the second divisional-drive operation group. The drive section performs a divisional-drive operation belonging to the first divisional-drive operation group in such a manner that, the liquid crystal application voltage is higher than the input application voltage at least in an intermediate luminance range, whereas the liquid crystal application voltage is, in a highlight luminance range, equal to or higher than the input application voltage but shows a tendency to be lower compared to that in the intermediate luminance range.

With the second liquid crystal display device of the invention, for the operation to drive for display the liquid crystal element in each of the pixels made of a VA-mode liquid crystal, based on the video signal, the drive operation for execution to each of the pixels for display is spatially or temporally divided into a plurality to perform an operation of multiplex driving. Therefore, compared with the case of not performing such an operation of multiplex driving, any change to the gamma characteristics becomes less obvious when the display screen is viewed in the diagonal direction. Further, for the operation in the first operation group of multiplex driving described above, in the highlight luminance range, the liquid crystal application voltage takes a higher-side voltage being equal to or higher than the input application voltage, and at the same time, shows a tendency to be lower compared to that in the intermediate luminance range. Therefore, compared with a previous operation of multiplex driving with which no such tendency to be low in voltage is observed in the highlight luminance range, the liquid crystal application voltage is prevented from abruptly increasing during voltage transition from low to high.

A third liquid crystal display device of the invention includes the plurality of pixels described above, and a drive section driving the liquid crystal element of each of the pixels for display through applying a voltage based on an input video signal to the liquid crystal element, the drive section performing a divisional-drive operation through space-divisionally or time-divisionally dividing a display drive operation on each of the pixels into a plurality based on the input video signal. The divisional-drive operation is configured of the first divisional-drive operation group and the second divisional-drive operation group. The drive section performs a divisional-drive operation belonging to the second divisional-drive operation group in such a manner that, the liquid crystal application voltage is lower than the input application voltage at least in the intermediate luminance range, whereas the liquid crystal application voltage is, in a lowermost luminance range, equal to or lower than the input application voltage but shows a tendency to be higher compared to that in the intermediate luminance range.

With the third liquid crystal display device of the invention, for the operation to drive for display the liquid crystal element in each of the pixels made of a VA-mode liquid crystal, based on the video signal, the drive operation for execution to each of the pixels for display is spatially or temporally divided into a plurality to perform an operation of multiplex driving. Therefore, compared with the case of not performing such an operation of multiplex driving, any change to the gamma characteristics becomes less obvious when the display screen is viewed in the diagonal direction. Further, for the operation in the second operation group of multiplex driving described above, in the lowermost luminance range, the liquid crystal application voltage takes a lower-side voltage being equal to or lower than the input application voltage, and at the same time, shows a tendency to be higher compared to that in the intermediate luminance range. Therefore, compared with a previous operation of multiplex driving with which no such tendency to be high in voltage is observed in the lowermost luminance range, for overdriving, for example, the liquid crystal application voltage is prevented from abruptly increasing from low to high.

According to the first liquid crystal display device of the invention, for the operation to drive for display the liquid crystal element in each of the pixels made of a VA-mode liquid crystal, the drive operation for execution to each of the pixels for display is spatially or temporally divided into a plurality to perform an operation of multiplex driving. Therefore, compared with the case of not performing such an operation of multiplex driving, any change to the gamma characteristics becomes less obvious when the display screen is viewed in the diagonal direction so that the viewing angle characteristics can be improved in terms of luminance. Further, for the operation in the first operation group of multiplex driving described above, in the highlight luminance range, the liquid crystal application voltage takes a higher-side voltage being equal to or higher than the input application voltage, and at the same time, shows a tendency to be lower compared to that in the intermediate luminance range. This thus can prevent the liquid crystal application voltage from abruptly increasing during voltage transition from low to high, thereby being able to prevent the occurrence of the variation of azimuth angle of the liquid crystal compared with a previous operation of multiplex driving. Moreover, for the operation in the second operation group of multiplex driving described above, in the lowermost luminance range, the liquid crystal application voltage takes a lower-side voltage being equal to or higher than the input application voltage, and at the same time, shows a tendency to be lower compared to that in the intermediate luminance range. Accordingly, for overdriving, for example, this thus can prevent the liquid crystal application voltage from abruptly increasing from low to high, thereby being able to prevent the occurrence of the rebounding compared with the previous operation of multiplex driving. Therefore, in such a liquid crystal display device using a VA-mode liquid crystal, the viewing angle characteristics can be improved in terms of luminance, and at the same time, the display quality can be better than that in the previous liquid crystal display device.

According to the second liquid crystal display device of the invention, for the operation to drive for display the liquid crystal element in each of the pixels made of a VA-mode liquid crystal, the drive operation for execution to each of the pixels for display is spatially or temporally divided into a plurality to perform an operation of multiplex driving. Therefore, compared with the case of not performing such an operation of multiplex driving, any change to the gamma characteristics becomes less obvious when the display screen is viewed in the diagonal direction so that the viewing angle characteristics can be improved in terms of luminance. Further, for the operation in the first operation group of multiplex driving described above, in the highlight luminance range, the liquid crystal application voltage takes a higher-side voltage being equal to or higher than the input application voltage, and at the same time, shows a tendency to be lower compared to that in the intermediate luminance range. This thus can prevent the liquid crystal application voltage from abruptly increasing during voltage transition from low to high, thereby being able to prevent the occurrence of the variation of azimuth angle of the liquid crystal compared with a previous operation of multiplex driving. Therefore, in such a liquid crystal display device using a VA-mode liquid crystal, the viewing angle characteristics can be improved in terms of luminance, and at the same time, the display quality can be better than that in the previous liquid crystal display device.

According to the third liquid crystal display device of the invention, for the operation to drive for display the liquid crystal element in each of the pixels made of a VA-mode liquid crystal, the drive operation for execution to each of the pixels for display is spatially or temporally divided into a plurality to perform an operation of multiplex driving. Therefore, compared with the case of not performing such an operation of multiplex driving, any change to the gamma characteristics becomes less obvious when the display screen is viewed in the diagonal direction so that the viewing angle characteristics can be improved in terms of luminance. Further, for the operation in the second operation group of multiplex driving described above, in the lowermost luminance range, the liquid crystal application voltage takes a lower-side voltage being equal to or lower than the input application voltage, and at the same time, shows a tendency to be higher compared to that in the intermediate luminance range. Accordingly, for overdriving, for example, this thus can prevent the liquid crystal application voltage from abruptly increasing from low to high, thereby being able to prevent the occurrence of the rebounding compared with the previous operation of multiplex driving. Therefore, in such a liquid crystal display device using a VA-mode liquid crystal, the viewing angle characteristics can be improved in terms of luminance, and at the same time, the display quality can be better than that in the previous liquid crystal display device.

DESCRIPTION OF EMBODIMENTS

In the below, an embodiment of the invention is described in detail by referring to the accompanying drawings.

Figure 1:
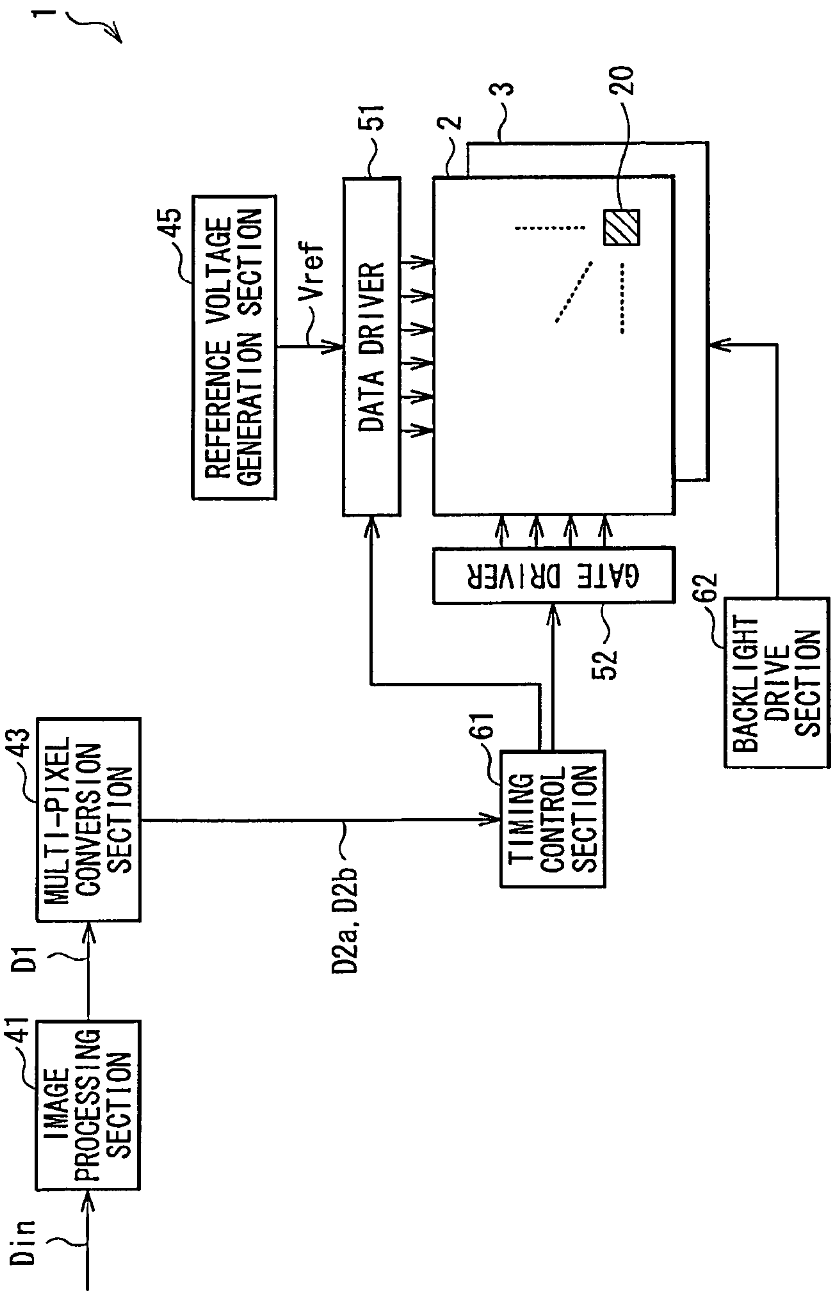
[FIG. 1] A block diagram showing the entire configuration of a liquid crystal display device according to an embodiment of the invention.

FIG. 1 is a diagram showing the entire configuration of a liquid crystal display device (liquid crystal display device 1) in an embodiment of the invention. This liquid crystal display device 1 includes a liquid crystal display panel 2, a backlight section 3, an image processing section 41, a multi-pixel conversion section 43, a reference voltage generation section 45, a data driver 51, a gate driver 52, a timing control section 61, and a backlight control section 63.

The backlight section 3 is a light source from which a light is directed to the liquid crystal display panel 2, and is configured by including a CCFL (Cold Cathode FluorescentLamp), an LED (Light EmittingDiode), and others.

Figure 2:
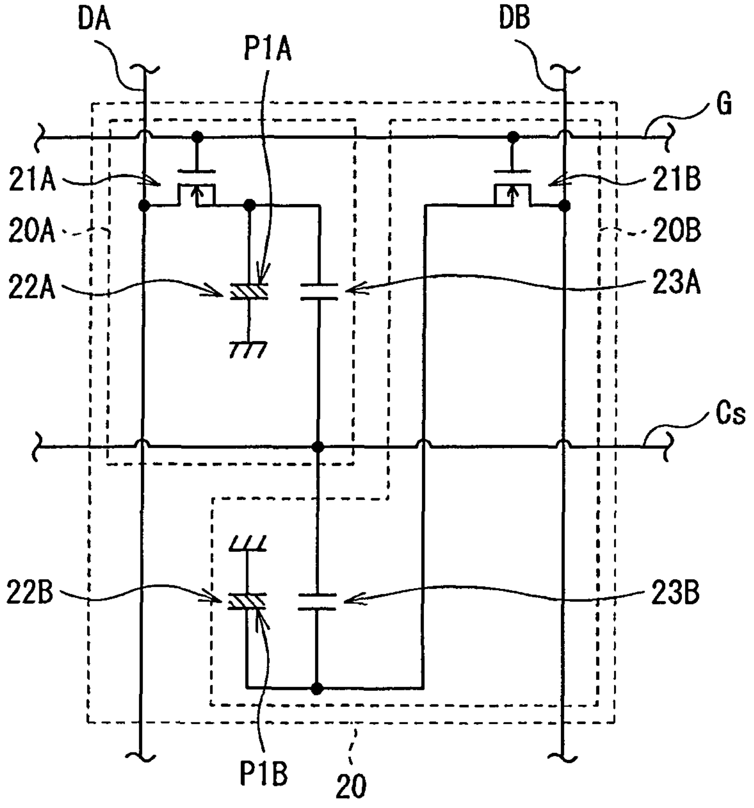
[FIG. 2] A circuit diagram of a pixel of FIG. 1, showing the detailed configuration thereof.
Figure 3:
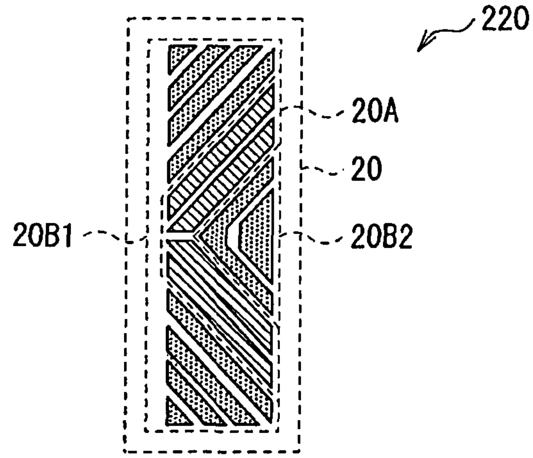
[FIG. 3] A plan view of a pixel electrode in a liquid crystal element of FIG. 3, showing the detailed configuration thereof

In response to a drive signal coming from the gate driver 52 that will be described later, the liquid crystal display panel 2 modulates the light coming from the backlight section 3 based on a drive voltage provided by the data driver 51 so that the resulting video display is made based on a video signal Din. The liquid crystal display panel 2 includes a plurality of pixels 20 arranged in a matrix as a whole. The pixels 20 are those each corresponding to any one of R (Red), G (Green), and B (Blue) (pixels each emit a display light of R, G, or B corresponding to the color of a color filter for R, G, or B provided thereto (not shown)). The pixels 20 are each formed therein with a pixel circuit including two sub pixels (sub pixels 20A and 20B that will be described later). The configuration of such pixel circuits will be described later in detail (FIG. 2 and 3).

The image processing section 41 generates a video signal D1 being an RGB signal by performing predetermined image processing with respect to a video signal Din coming from the outside.

Figure 4:
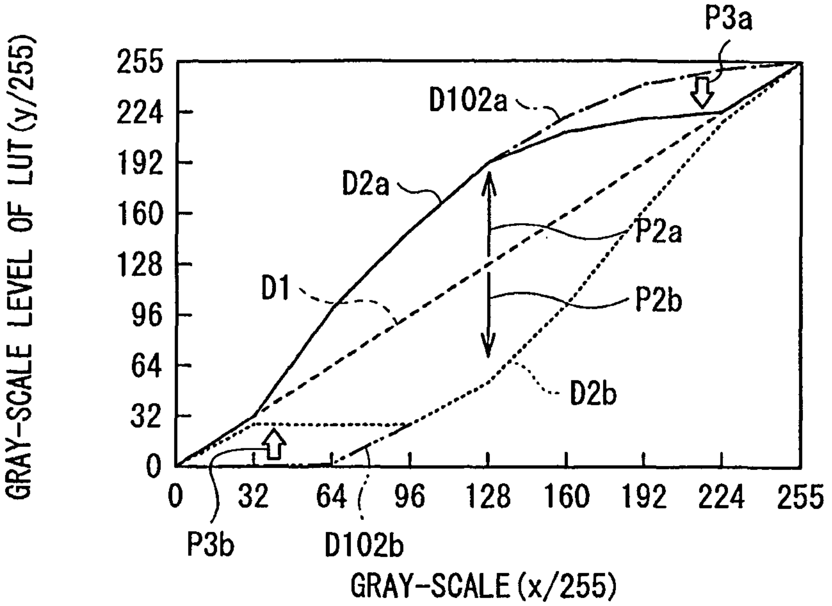
[FIG. 4] A characteristics diagram of an exemplary LUT (Lookup Table) for use in a multi-pixel conversion section of FIG. 1.

The multi-pixel conversion section 43 converts, by using a lookup table (LUT) that will be described later, the video signal D1 coming from the image processing section 41 into two video signals D2*a* and D2*b* for use respectively by the sub pixels (performs multi-pixel conversion), and supplies the resulting video signals D2*a* and D2*b* to the timing control section 61. This LUT provides the correlation between the video signal D1 and the video signals respectively corresponding to the sub pixels in terms of gray-scale level of luminance. Such a correlation is provided on the basis of a video signal of the pixel corresponding to any one of R, G, and B. The LUT will be described in more detail later (FIG. 4).

The reference voltage generation section 45 supplies a reference voltage Vref to the data driver 51 for use during D/A (Digital/Analog) conversion that will be described later. To be specific, this reference voltage Vref covers a range of reference voltages from black voltage (voltage with the gray-scale level of 0 of luminance that will be described later) to white voltage (e.g., voltage with the gray-scale level of 255 of luminance that will be described later). Also in this embodiment, such a reference voltage Vref is shared by the pixels each corresponding to any one of R, G, and B. Note here that this reference voltage generation section 45 is in the resistor tree structure or others in which a plurality of resistors are connected in series, for example.

The gate driver 52 line-sequentially drives the pixels 20 in the liquid crystal display panel 2 along scan lines that are not shown (gate lines G that will be described later) in accordance with timing control applied by the timing control section 61.

The data driver 51 supplies a drive voltage to each of the pixels 20 (more in detail, to each of the sub pixels in each of the pixels 20) of the liquid crystal display panel 2 based on the video signals D2*a* and D2*b* coming from the timing control section 61. To be specific, by performing D/A conversion to the video signals D2*a* and D2*b* using the reference voltage Vref provided by the reference voltage generation section 45, this data driver 51 is configured so as to generate video signals each being an analog signal (drive voltage described above). The resulting video signals are output to each of the pixels 20.

The backlight drive section 62 controls the illumination operation of the backlight section 3. The timing control section 61 controls the drive timing of the gate driver 52 and that of the data driver 51, and supplies the video signals D2*a* and D2*b* to the data driver 51.

By referring to FIGS. 2 and 3, described next in detail is the configuration of the pixel circuit formed in each of the pixels 20. FIG. 2 shows an exemplary circuit configuration of the pixel circuit in the pixel 20. FIG. 3 shows an exemplary configuration in a planar view of a pixel electrode in a liquid crystal element in the pixel circuit.

The pixel 20 is configured by the two sub pixels 20A and 20B, and is in the multi-pixel structure. The sub pixel 20A includes a liquid crystal element 22A being a main capacitor, an auxiliary capacitor 23A, and a thin film transistor (TFT) element 21A. Similarly, the sub pixel 20B includes a liquid crystal element 22B being a main capacitor, an auxiliary capacitor 23B, and a TFT element 21B. The pixel 20 is connected with a gate line G, two data lines DA and DB, and an auxiliary capacity line Cs. The gate line G is for line-sequentially selecting a pixel as a drive target, and the two data lines DA and DB are for supplying the drive voltage (drive voltage provided by the data driver 51) to each of the sub pixels 20A and 20B in the pixel being the drive target. The auxiliary capacity line Cs is a bus line for supplying a predetermined reference potential to the opposing electrode side of the auxiliary capacitors 23A and 23B.

The liquid crystal element 22A serves as a display element that operates for display (emits a display light) in accordance with the drive voltage, which is provided to one end thereof from the data line DA via the TFT element 21A. Similarly, the liquid crystal element 22B serves as a display element that operates for display (emits a display light) in accordance with the drive voltage, which is provided to one end thereof from the data line DB via the TFT element 21B. These liquid crystal elements 22A and 22B are each configured to include a liquid crystal layer (not shown) made of a VA-mode liquid crystal, and a pair of electrodes (not shown) sandwiching this liquid crystal layer therebetween. The side of one of (one end of) these electrodes in pair (the side of reference numerals P1A and P1B in FIG. 2) is connected with the source of each of the TFT elements 21A and 21B, and with one end of each of the auxiliary capacitors 23A and 23B. The other side (the other end) thereof is grounded. The electrode on one side of the electrodes in pair (the side of reference numerals P1A and P1B in FIG. 2) is a flat-shaped pixel electrode 220 as shown in FIG. 3, for example, and is configured by a pixel electrode on the side of the sub pixel 20A, and a pixel electrode on the side of the sub pixel 20B (a combination of 20B-1 and 20B-2).

The auxiliary capacitors 23A and 23B are capacitors respectively for stabilizing the liquid crystal elements 22A and 22B in terms of their accumulated charge. One end of the auxiliary capacitor 23A (one of the electrodes) is connected to one end of the liquid crystal element 22A and to the source of the TFT element 21A, and the remaining end (opposing electrode) is connected to the auxiliary capacity line Cs. One end of the auxiliary capacitor 23B (one of the electrodes) is connected to one end of the liquid crystal element 22B and to the source of the TFT element 21B, and the remaining end (opposing electrode) is connected to the auxiliary capacity line Cs.

The TFT element 21A is configured by a MOS-FET (Metal OxideSemiconductor-Field Effect Transistor). In the TFT element 21A, the gate is connected to the gate line G, the source is connected to one end of the liquid crystal element 22A and to one end of the auxiliary capacitor 23A, and the drain is connected to the data line DA. This TFT element 21A serves as a switching element for supplying a drive voltage (drive voltage based on the video signal D2*a*) for use by the sub pixel 20A to one end of the liquid crystal element 22A and to one end of the auxiliary capacitor 23A. To be specific, in accordance with a selection signal coming from the gate driver 52 over the gate line G, the TFT element 21A is provided for selectively establishing the continuity between the data line DA and one end of the liquid crystal element 22A or between the data line DA and one end of the auxiliary capacitor 23A.

The FTF element 21B is similarly configured by a MOS-FET, and therein, the gate is connected to the gate line G, the source is connected to one end of the liquid crystal element 22B and to one end of the auxiliary capacitor 23B, and the drain is connected to the data line DB. This TFT element 21B serves as a switching element for supplying a drive voltage (drive voltage based on the video signal D2*b*) for use by the sub pixel 20B to one end of the liquid crystal element 22B and to one end of the auxiliary capacitor 23B. To be specific, in accordance with a selection signal provided by the gate driver 52 over the gate line G, the TFT element 21B is provided for selectively establishing the continuity between the data line DB and one end of the liquid crystal element 22B or between the data line DB and one end of the auxiliary capacitor 23B.

Next, by referring to FIG. 4, described in detail is the LUT for use in the multi-pixel conversion section 43. Note that, in the characteristics diagram that will be described below, as an example, the grays-scale level of luminance is set to fall within a range from 0/255 (state of black display) to 255/255 (state of white display).

Such an LUT is provided for use to divide the gray-scale level of luminance of the video signal D1 provided to the multi-pixel conversion section 43 as indicated by arrows P2*a* and P2*b* in FIG. 4, for example. The division results are the gray-scale level of luminance of the video signal D2*a* for use by the sub pixel 20A, and the gray-scale level of luminance of the video signal D2*b* for use by the sub pixel 20B. In other words, the LUT is used for, based on the video signal D1, spatially dividing the drive operation to each of the pixels 20 for display into two to perform an operation of multiplex driving to each of the sub pixels 20A and 20B. In other words, such an operation of multiplex driving is a combination of a first operation of multiplex driving (operation of multiplex driving with respect to the sub pixel 20A) and a second operation of multiplex driving (operation of multiplex driving with respect to the sub pixel 20B). In the first operation of multiplex driving, the operation of multiplex driving is performed so that the liquid crystal application voltage to be applied to the liquid crystal element 22A takes a higher-side voltage being equal to or higher than an input application voltage corresponding to the video signal D1. In the second operation of multiplex driving, the operation of multiplex driving is performed so that the liquid crystal application voltage to be applied to the liquid crystal element 22B takes a lower-side voltage being equal to or lower than the input application voltage described above.

In this LUT, during the operation of multiplex driving with respect to the sub pixel 20A, as indicated by the arrow P2*a* in FIG. 4, for example, at least in an intermediate luminance range, the liquid crystal application voltage to be applied to the liquid crystal element 22A is higher than the input application voltage corresponding to the video signal D1. Also as indicated by an arrow P3*a* in FIG. 4, for example, in a highlight luminance range, the liquid crystal application voltage to be applied to the liquid crystal element 22A takes a higher-side voltage being equal to or higher than the input application voltage corresponding to the video signal D1, and at the same time, shows a tendency to be lower compared to that in the intermediate luminance range. To be specific, the liquid crystal application voltage to be applied to the liquid crystal element 22A in such a highlight luminance range is set to be equal to or higher than the input application voltage corresponding to the video signal D1, and to be equal to or lower than the voltage with which the phenomenon of "variation of azimuth angle of liquid crystal" generally occurs.

Also in this LUT, during the operation of multiplex driving with respect to the sub pixel 20B, as indicated by the arrow P2*b* in FIG. 4, for example, at least in a region with an intermediate level of luminance, the liquid crystal application voltage to be applied to the liquid crystal element 22B is lower than the input application voltage corresponding to the video signal D1. Also as indicated by an arrow P3*b* in FIG. 4, for example, in a lowermost luminance range, the liquid crystal application voltage to be applied to the liquid crystal element 22B takes a lower-side voltage being equal to or lower than the input application voltage corresponding to the video signal D1, and at the same time, shows a tendency to be higher than that in the intermediate luminance range. To be specific, other than the minimum gray-scale level of luminance (gray-scale level of 0) in the video signal D1 in a lowermost luminance range, the liquid crystal application voltage to be applied to the liquid crystal element 22B is set to a higher-side voltage which is equal to or higher than a minimum value of the voltage corresponding to the minimum gray-scale level of luminance (other than the gray-scale level of 0 in the video signal D1, the voltage is set so as not to be in the gray-scale level of 0 in the video signal D2*b*).

In this example, the components of the multi-pixel conversion section 43, the timing control section 61, the reference voltage generation section 45, the data driver 51, and the gate driver 52 are a specific example of a "drive section" in the invention. Further, the LUT of FIG. 4 is a specific example of a "first LUT" in the invention. Still further, the sub pixel 20A is a specific example of a "first sub pixel group" in the invention, and the sub pixel 20B is a specific example of the "second sub pixel group" in the invention.

Described next is the operation of the liquid crystal display device 1 in the embodiment.

First of all, by referring to FIGS. 1 to 4, described is the basic operation of the liquid crystal display device 1.

With this liquid crystal display device 1, as shown in FIG. 1, the video signal Din coming from the outside is subjected to image processing by the image processing section 41, and the generation result is the video signal D1 for use by each of the pixels 20. This video signal D1 is provided to the multi-pixel conversion section 43. In the multi-pixel conversion section 43, with the use of the LUT described above, the video signal D1 provided as such is converted into the two video signals D2*a* and D2*b* for respective use by the sub pixels 20A and 20B (multi-pixel conversion). These two video signals D2*a* and D2*b* are each provided to the data driver 51 via the timing control section 61. In the data driver 51, the video signals D2*a* and D2*b* are subjected to D/A conversion using the reference voltage Vref provided by the reference voltage generation section 45 so that two video signals each being an analog signal are generated. Based on the two video signals, the pixels 20 are each driven line-sequentially for display by the drive voltage coming from the gate driver 52 and the data driver 51 for use by the sub pixels 20A and 20B in each of the pixels 20.

To be specific, as shown in FIGS. 2 and 3, in accordance with a selection signal coming from the gate driver 52 over the gate line G, the TFT element 21A is turned ON/OFF and the TFT element 21B is turned OFF/ON, and the continuity is selectively established between the data lines DA and DB and the liquid crystal elements 22A and 22B or between the data lines DA and DB and the auxiliary capacitors 23A and 23B. With the continuity established as such, the drive voltage based on the two video signals coming from the data driver 51 is provided to the liquid crystal elements 22A and 22B, and to the auxiliary capacitors 23A and 23B so that the pixels are driven for display.

In response thereto, in the pixel 20 in which the continuity is established between the data lines DA and DB and the liquid crystal elements 22A and 22B or between the data lines DA and DB and the auxiliary capacitors 23A and 23B, an illumination light coming from the backlight section 3 is modulated in the liquid crystal display panel 2, and the modulation result is output as a display light. In this manner, the video display based on the video signal Din is made in the liquid crystal display device 1.

Figure 5:
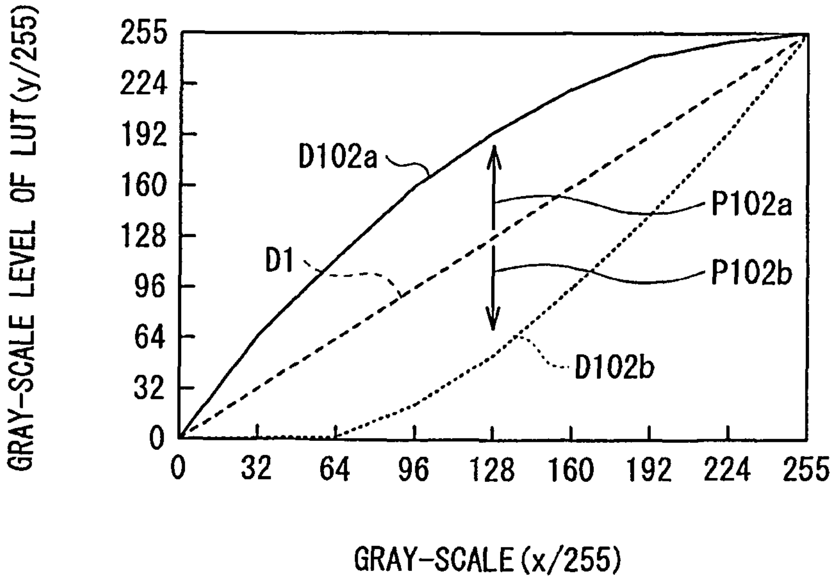
[FIG. 5] A characteristics diagram of an LUT according to a comparison example.
Figure 6:
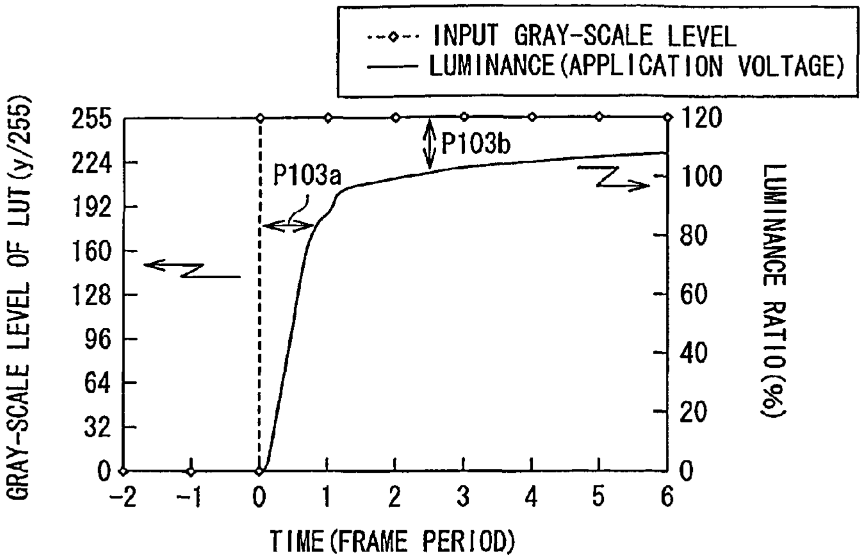
[FIG. 6] A characteristics diagram for illustrating a variation of azimuth angle of the liquid crystal.
Figure 7:
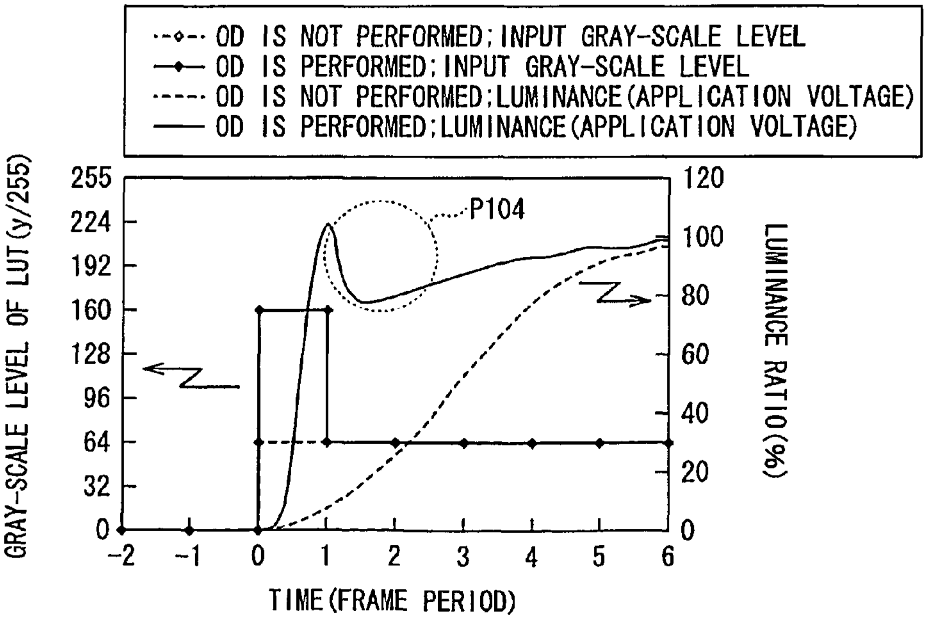
[FIG. 7] A characteristics diagram for illustrating a phenomenon of rebounding.

By referring to FIGS. 5 to 7 in addition to FIGS. 1 to 4, described in detail next are the feature points of the drive operation in the liquid crystal display device of the invention in comparison with a device in a comparison example. FIGS. 5 to 7 are diagrams for illustrating an LUT in a previous liquid crystal display device in the comparison example, and problems with the use of the LUT.

Figure 14:
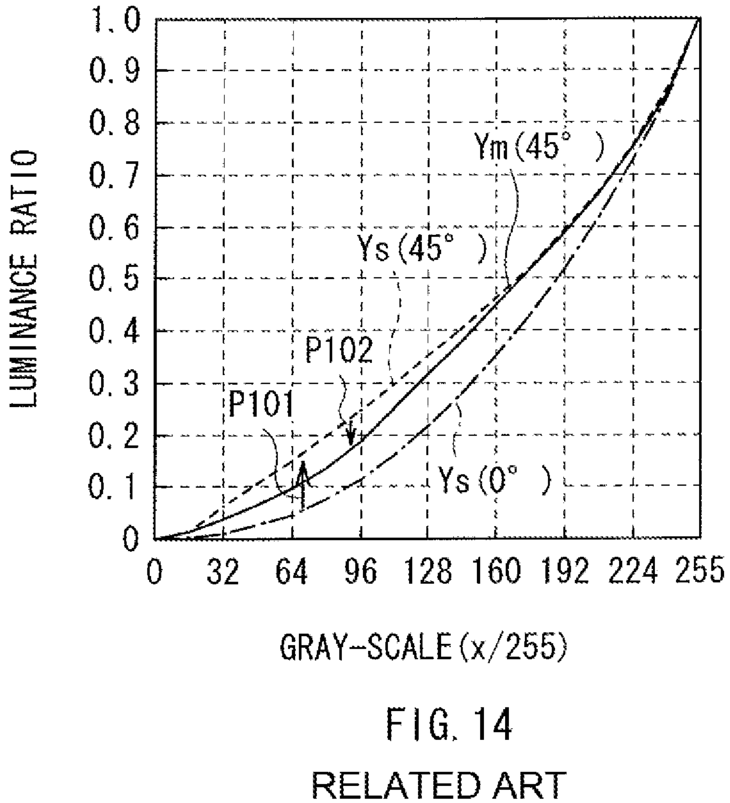
FIG. 14 RELATED ART
[FIG. 14] A characteristics diagram showing an exemplary relationship between, in a previous liquid crystal display device, the gray-scale of a video signal and the luminance ratio in the front direction of a liquid crystal display panel and that in the 45-degree direction thereof.
Figure 15:
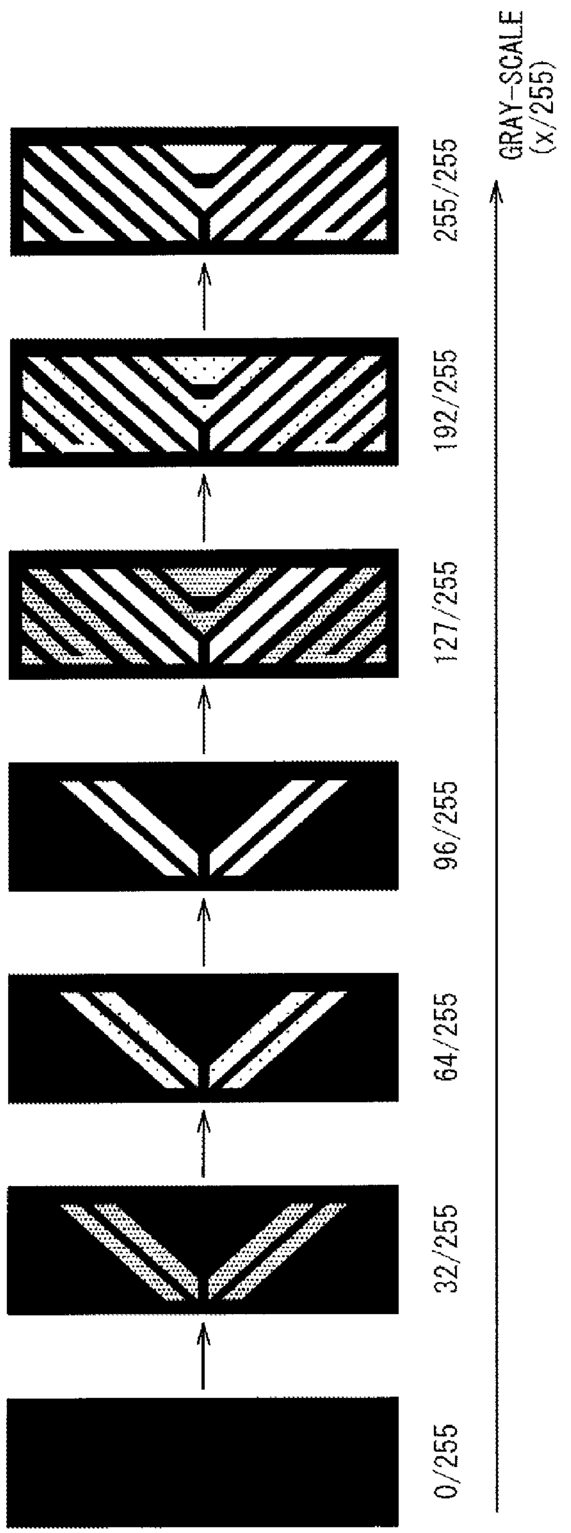
FIG. 15 RELATED ART
[FIG. 15] A plan view showing an exemplary relationship between, in a previous multi-pixel structure, the gray-scale of a video signal and the display state of each sub pixel.

First of all, in the liquid crystal display device 1 in the embodiment, with the use of the LUT of FIG. 4, for an operation to drive for display the liquid crystal elements 22A and 22B in each of the pixels 20 made of a VA-mode liquid crystal, the drive operation to each of the pixels 20 is spatially divided into two based on the video signal D1 so that the resulting operation of multiplex driving is performed (refer to the arrows P2*a* and P2*b* in FIG. 4). To be specific, based on the configuration that each of the pixels 20 is a combination of the two sub pixels 20A and 20B, and also based on video signals D3*a* and D3*b* being the results of multi-pixel conversion to the video signal D1 (not shown; two video signals each being an analog signal coming from the data driver 51), the operation of multiplex driving is performed to each of the sub pixels 20A and 20B after the operation of driving the pixels 20 for display is spatially divided into two. Accordingly, compared with the case of not performing such an operation of multiplex driving, any change (change from the case when the display screen is viewed in the front direction) to the gamma characteristics (characteristics showing the relationship between the gray-scale level of luminance of the video signal D1 and the luminance) becomes less obvious when the display screen is viewed in the diagonal direction (e.g., in the direction of 45°). As a result, as the luminance characteristics Ym(45°) in FIG. 14, for example, the viewing angle characteristics are improved in terms of luminance compared with the case of not performing the operation of multiplex driving in the multi-pixel structure (e.g., the luminance characteristics Ys(45°) in FIG. 14).

On the other hand, also in the liquid crystal display device in the comparison example, the operation of multiplex driving in the multi-pixel structure is similarly performed (e.g., refer to arrows P102*a* and P102*b* in FIG. 5). Compared with the case of not performing the operation of multiplex driving in the multi-pixel structure, the viewing angle characteristics are improved in terms of luminance. Note that, in this comparison example, the operation of multiplex driving in the multi-pixel structure is performed using such an LUT as shown in FIG. 5 as an alternative to the LUT in the embodiment of FIG. 4. To be specific, with this LUT, for the operation in the operation of multiplex driving with respect to the sub pixel 20A (corresponding to a video signal D102*a* in FIG. 5), no tendency is shown to be low in voltage in a highlight luminance range as indicated by the arrow P3*a* in FIG. 4. Also for the operation in the operation of multiplex driving with respect to the sub pixel 20B (corresponding to a video signal D102*b* in FIG. 5), no tendency is shown to be high in voltage in a lowermost luminance range as indicated by the arrow P3*b* in FIG. 4.

In the liquid crystal display device using the LUT as such in the comparison example, as described above, no tendency is shown to be low in voltage in a highlight luminance range for the operation of multiplex driving with respect to the sub pixel 20A, and no tendency is shown to be high in voltage in a lowermost luminance range for the operation of multiplex driving with respect to the sub pixel 20B. This easily results in the following phenomenon. As a result, the display characteristics of moving images are impaired, and the display image quality is degraded.

To be specific, first of all, as indicated by reference numerals P103*a* and P103*b* in FIG. 6, for example, for a voltage to be applied to the liquid crystal element 22A in the sub pixel 20A (liquid crystal application voltage), for transition thereof from low (e.g., gray-scale level of 0/gray-scale level of 255) to high (e.g., gray-scale level of 255/gray-scale level of 255), the luminance does not reach any desired value of voltage (value of luminance), thereby easily adversely affecting the response time of the liquid crystal. This is because, with the halftone technique like the sub pixel structure, the sub pixel 20A being in the much lower gray-scale level is a target for application of a high voltage compared with the case of not using the halftone technique. This is the reason why the response time is adversely affected more often with a larger number of gray-scale levels by the "variation of azimuth angle of liquid crystal".

Moreover, as the video signal D102*b* in FIG. 5, for example, with a voltage to be applied to the liquid crystal element 22B in the sub pixel 20B (liquid crystal application voltage), during overdriving (OD), the gray-scale level of 0 is in need more often than the case of not using the halftone technique. This thus requires a steep increase of the liquid crystal application voltage from low to high. As a result, the response speed of the liquid crystal is indeed improved by such overdriving but as indicated by a reference numeral P104 in FIG. 7, for example, the "phenomenon of rebounding" is easily occurred if the voltage of an original gray-scale value is applied to the liquid crystal elements after the completion of overdriving.

On the other hand, in the liquid crystal display device 1 in the embodiment, in the LUT of FIG. 4, during the operation, of multiplex driving with respect to the sub pixel 20A, as indicated by the arrow P3*a* in FIG. 4, in a highlight luminance range, the liquid crystal application voltage to be applied to the liquid crystal element 22A takes a higher-side voltage being equal to or higher than the input application voltage corresponding to the video signal D1, and at the same time, shows a tendency to be lower compared to that in an intermediate luminance range. To be specific, the liquid crystal application voltage to be applied to the liquid crystal element 22A in such a region with the high level of luminance is set to be equal to or higher than the input application voltage corresponding to the video signal D1, and to be equal to or lower than the voltage with which the phenomenon of "variation of azimuth angle of liquid crystal" generally occurs. As such, compared with the operation of multiplex driving in the comparison example in which no such tendency to be low in voltage is observed in a highlight luminance range, the liquid crystal application voltage is prevented from abruptly increasing during voltage transition from low to high. This accordingly reduces the number of gray-scale levels causing the "variation of azimuth angle of the liquid crystal" (e.g., reduction from 32 to 6 gray-scale levels). Note here that, during the operation of multiplex driving with respect to the sub pixel 20B, conversely, a highlight luminance range shows a tendency to be high in voltage not to cause any change to the gamma characteristics compared with the case with the video signal D1.

During the operation of multiplex driving with respect to the sub pixel 20B, as indicated by the arrow P3*b* in FIG. 4, for example, in a lowermost luminance range, the liquid crystal application voltage to be applied to the liquid crystal element 22B takes a lower-side voltage being equal to or lower than the input application voltage corresponding to the video signal D1, and at the same time, shows a tendency to be higher compared to that in an intermediate luminance range. To be specific, other than the minimum gray-scale level of luminance (gray-scale level of 0) in the video signal D1 in the lowermost luminance range, the liquid crystal application voltage to be applied to the liquid crystal element 22B is set to a higher-side voltage which is equal to or higher than a minimum value of the voltage corresponding to the minimum gray-scale level of luminance (other than the gray-scale level of 0 in the video signal D1, the voltage is set so as not to be in the gray-scale level of 0 in the video signal D2*b*). As such, compared with the operation of multiplex driving in the comparison example in which no such tendency to be high in voltage is observed in a lowermost luminance range, for overdriving, the liquid crystal application voltage is prevented from abruptly increasing during voltage transition from low to high. This accordingly reduces the number of gray-scale levels causing the "phenomenon of rebounding" (e.g., reduction from 64 to 20 gray-scale levels). Note here that, also at this time, during the operation of multiplex driving with respect to the sub pixel 20A, a tendency to be low in voltage is conversely observed in the lowermost luminance range not to cause any change to the gamma characteristics compared with the case with the video signal D1.

As described above, in the embodiment, for an operation to drive for display the liquid crystal elements 22A and 22B in each of the pixels 20 made of a VA-mode liquid crystal, the drive operation for execution to each of the pixels 20 for display is spatially divided into two so that the resulting operation of multiplex driving is performed. Accordingly, compared with the case of not performing such an operation of multiplex driving, any change to the gamma characteristics becomes less obvious when the display screen is viewed in the diagonal direction. This favorably leads to the better viewing angle characteristics in terms of luminance. Moreover, for an operation of multiplex driving with respect to the sub pixel 20A, in a highlight luminance range, the liquid crystal application voltage to be applied to the liquid crystal element 22A takes a higher-side voltage being equal to or higher than the input application voltage corresponding to the video signal D1, and at the same time, shows a tendency to be lower compared to that in an intermediate luminance range. This accordingly prevents the liquid crystal application voltage from abruptly increasing during voltage transition from low to high, thereby preventing the variation of azimuth angle of the liquid crystal compared with the previous operation of multiplex driving. Moreover, for an operation of multiplex driving with respect to the sub pixel 20B, in a lowermost luminance range, the liquid crystal application voltage to be applied to the liquid crystal element 22B takes a lower-side voltage being equal to or lower than the input application voltage corresponding to the video signal D1, and at the same time, shows a tendency to be higher compared to that in an intermediate luminance range. Therefore, for overdriving, this accordingly prevents the liquid crystal application voltage from abruptly increasing from low to high, thereby preventing the occurrence of the phenomenon of rebounding compared with the previous operation of multiplex driving. Accordingly, in the liquid crystal display device using a VA-mode liquid crystal, the viewing angle characteristics can be improved in terms of luminance, and at the same time, the display image quality can be better than that in the previous liquid crystal display device.

To be specific, such effects as described above can be achieved by the pixels 20 each configured by the two sub pixels 20A and 20B, and based on the video signals D3*a* and D3*b* being the results of the multi-pixel conversion executed to the video signal D1, the drive operation for execution to each of the pixels 20 for display being spatially divided into two to perform the operation of multiplex driving separately to each of the sub pixels 20A and 20B.

Further, by using the LUT providing the correlation between the video signal D1 and the video signals D3*a* and D3*b* respectively corresponding to the sub pixels 20A and 20B, the drive operation for execution to each of the pixels 20 for display can be spatially divided into two to perform the operation of multiplex driving separately to each of the sub pixels 20A and 20B.

Still further, for an operation of multiplex driving with respect to the sub pixel 20B, other than the minimum gray-scale level of luminance (gray-scale level of 0) in the video signal D1 in a lowermost luminance range, the liquid crystal application voltage to be applied to the liquid crystal element 22B is set so as to take a value on the higher-voltage side than a minimum value of the voltage corresponding to the minimum gray-scale level of luminance (other than the gray-scale level of 0 in the video signal D1, the voltage is set so as not to be in the gray-scale level of 0 in the video signal D2*b*). This accordingly prevents the occurrence of the phenomenon of rebounding during the overdriving.

As such, while the invention has been described with the embodiment as an example, the foregoing description is in all aspects illustrative and not restrictive to the embodiment, and it is understood that numerous other modifications can be devised.

Figure 8:
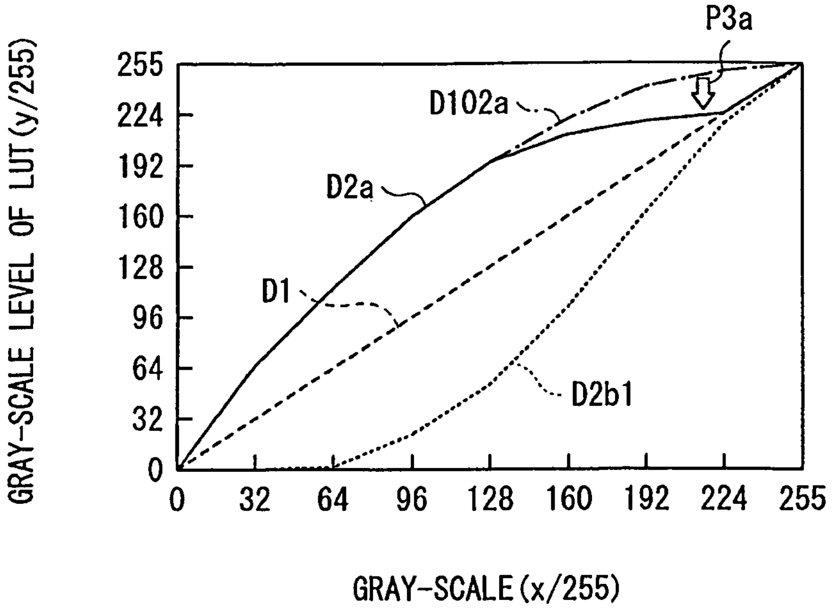
[FIG. 8] A characteristics diagram of an LUT according to a modified example of the invention.
Figure 9:
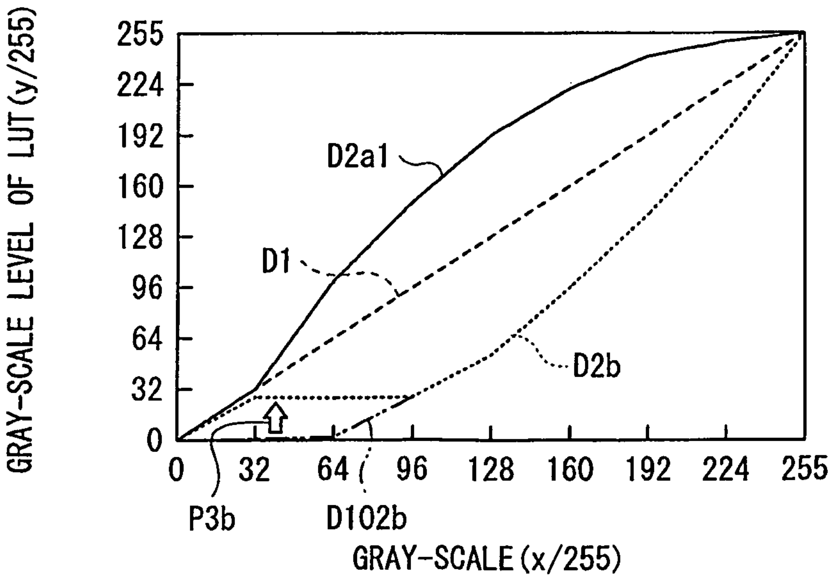
[FIG. 9] A characteristics diagram of an LUT according to another modified example of the invention.

As an exemplary modification using the LUT of FIG. 4, exemplified in the above embodiment is the case of taking such two measures as indicated by the arrows P3*a* and P3*b* in the drawing to prevent the two phenomena of "variation of azimuth angle of liquid angle" and "rebounding". Alternatively, only one of such two measures may be taken. To be specific, using an LUT of FIG. 8, for example, one measure indicated by the arrow P3*a* in the drawing may be taken to prevent only the phenomenon of "variation of azimuth angle of liquid crystal". Still alternatively, using an LUT of FIG. 9, for example, one measure indicated by the arrow P3*b* in the drawing may be taken to prevent only the phenomenon of "rebounding". If these are the configurations, the viewing angle characteristics can be improved in terms of luminance, and at the same time, the display image quality can be better to some degree than that in the previous liquid crystal display device.

Also in the above embodiment, exemplified is the multi-pixel configuration in which each of the pixels 20 is connected with a gate line G and two data lines DA and DB as the pixel 20 and the sub pixels 20A and 20B shown in FIG. 2. Alternatively, as a pixel 20-1 and sub pixels 20A-1 and 20B-1 shown in FIG. 10, for example, the invention is surely applicable also to such a multi-pixel configuration in which each of the pixels 20-1 is connected with two gate lines GA and GB and a data line D. With such a pixel 20-1, for example, provided are two sub frame periods being the results of dividing a unit frame for display driving (a frame period) into two along a time axis, and the sub pixels 20A and 20B are driven in accordance with a selection signal provided within each of the sub frame periods over the gate lines GA and GB, and in accordance with a drive voltage provided by the data driver 51.

Figure 10:
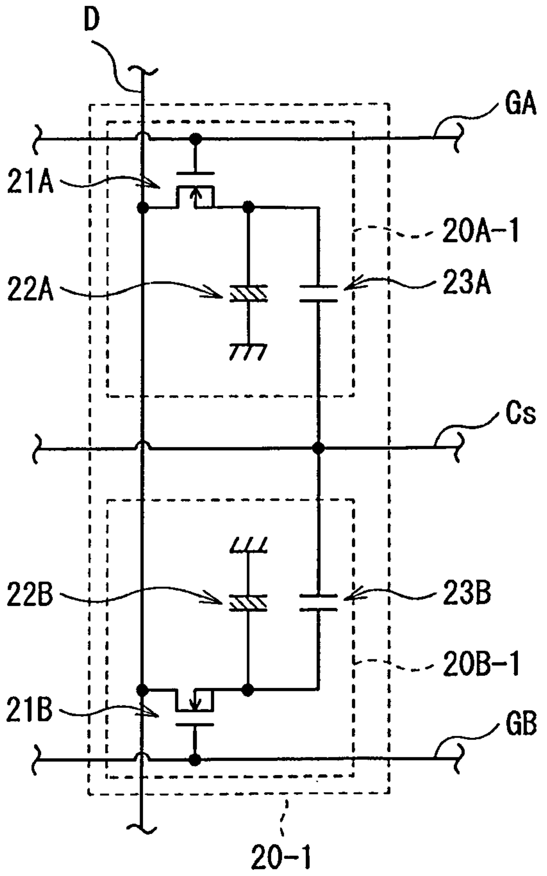
[FIG. 10] A circuit diagram of a pixel according to still another modified example of the invention, showing the detailed configuration thereof.
Figure 11:
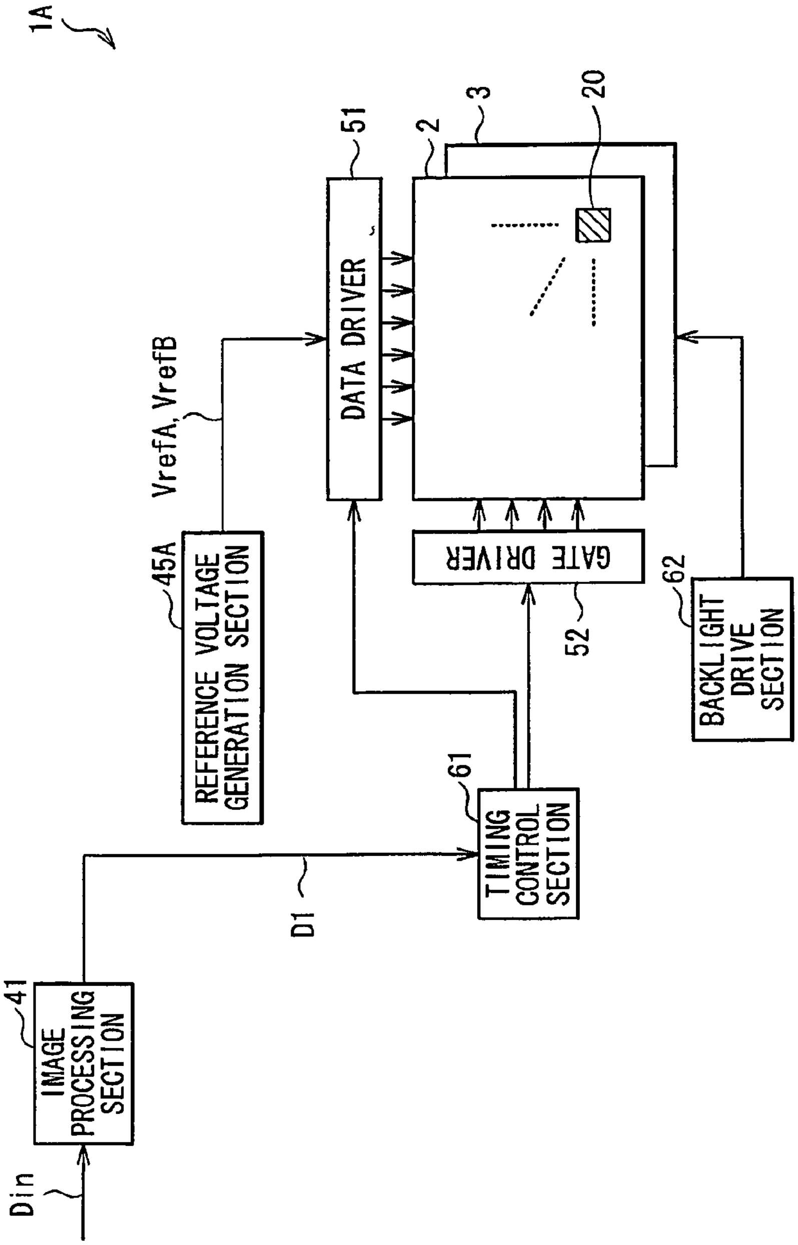
[FIG. 11] A block diagram showing the entire configuration of a liquid crystal display device according to still another modified example of the invention.

Also in the above embodiment, as shown in FIGS. 1 and 4, exemplified is the case of performing, separately to the sub pixels 20A and 20B, an operation of multiplex driving after spatially dividing into two an operation of driving the pixels 20 for display by using the LUT providing the correlation between the video signal D1 and the video signals D3*a* and D3*b* respectively corresponding to the sub pixels 20A and 20B. This is surely not restrictive, and any other technique is also possible. To be specific, like the liquid crystal display device 1A of FIG. 11, for example, the reference voltage for use to D/A-convert the video signal D1 coming from the image processing section 41 into the video signals D3*a* and D3*b* (not shown) in the data driver 51 may be set so as to vary between the sub pixels 20A and 20B (a reference voltage VrefA corresponding to the sub pixel 20A is different from a reference voltage VrefB corresponding to the sub pixel 20B). With such a setting, similarly to the above embodiment, an operation to drive the pixels 20 for display may be spatially divided into two for performing an operation of multiplex driving separately to the sub pixels 20A and 20B. If this is the configuration, the effects similar to those in the above embodiments can be favorably achieved. Also in this case, the multi-pixel configuration as shown in FIG. 10 is applicable.

Figure 12:
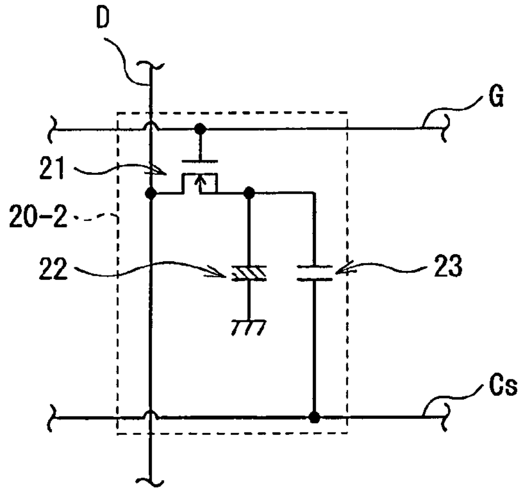
[FIG. 12] A circuit diagram of a pixel in still another modified example of the invention, showing the detailed configuration thereof.
Figure 13:
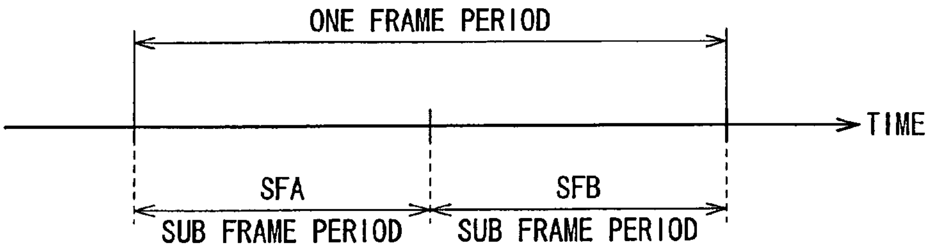
[FIG. 13] A timing diagram for illustrating a sub frame period during display driving in the modified example of FIG. 12.

Also in the above embodiment, exemplified is the case in which each of the pixels 20 is configured by the two sub pixels 20A and 20B, and an operation to drive the pixels 20 for display is spatially divided into two for performing an operation of multiplex driving separately to the sub pixels 20A and 20B. This is surely not restrictive, and any other technique will be also applicable. To be specific, with a pixel 20-2 in the normal single configuration as shown in FIG. 12 (e.g., pixel including one liquid crystal element 22, one auxiliary capacitor 23, and one TFT element 21 with a connection established with a gate line G and a data line D), as shown in FIG. 13, for example, the effects of halftone may be derived similarly to the case with the multi-pixel structure by temporally dividing a unit frame for display driving (a frame period) into two sub frame periods SFA and SFB, and by representing any desired level of luminance using a combination of a sub frame(s) SFA of high level of luminance and a sub frame(s) SFB of low level of luminance. To be more specific, based on the video signal D1, an operation to drive the pixels 20-2 for display is temporally divided into two for performing an operation of multiplex driving separately to the sub frame periods SFA and SFB. In other words, the operation of multiplex driving at this time is a combination of a first operation of multiplex driving (operation of multiplex driving with respect to the sub frame period SFA) and a second operation of multiplex driving (operation of multiplex driving with respect to the sub frame period SFB). In the first operation of multiplex driving, the operation of multiplex driving is performed so that the liquid crystal application voltage to be applied to the liquid crystal element 22 takes a higher-side voltage being equal to or higher than the input application voltage corresponding to the video signal D1. In the second operation of multiplex driving, the operation of multiplex driving is performed so that the liquid crystal application voltage to be applied to the liquid crystal element 22 takes a lower-side voltage being equal to or lower than the input application voltage described above. As such a technique of performing an operation of multiplex driving separately to the sub frame periods SFA and SFB after temporally dividing an operation to drive the pixels 20-2 into two, similarly to the LUT of FIG. 4, an LUT providing the correlation between the video signal D1 and the video signals respectively corresponding to the sub frame periods SFA and SFB (second LUT) may be used. Alternatively, similarly to the liquid crystal display device 1A of FIG. 11, the reference voltage for use to D/A-convert the video signal D1 may be set so as to vary between the sub frame periods SFA and SFB. If these are the configurations, the effects similar to those in the above embodiment can be successfully achieved.

Also in the above embodiment, exemplified is the flat shape of the pixel electrode 220. Such a flat shape of the pixel electrode is surely not restrictive to that of FIG. 3.

Furthermore, the number of the sub pixels in each of the pixels 20 and the number of the sub frame periods in a frame period are both surely not restrictive to two as exemplified above, and both may be three or more.

The invention claimed is:

1. A liquid crystal display device, comprising:

a plurality of pixels arranged in a matrix, each one of the plurality of pixels being provided with a respective liquid crystal element made of a liquid crystal of a vertical alignment (VA) mode; and a drive section driving the respective liquid crystal element of each of the pixels for display by applying a voltage based on an input video signal to the liquid crystal element, the drive section performing a divisional-drive operation by space-divisionally or time-divisionally dividing a display drive operation on each of the pixels into a plurality based on the input video signal so that the divisional-drive operation includes a first divisional-drive operation group and a second divisional-drive operation group, the first divisional-drive operation group allowing a liquid crystal application voltage to be a higher-side voltage which is equal to or higher than an input application voltage, and a second divisional-drive operation group allowing the liquid crystal application voltage to be a lower-side voltage which is equal to or lower than the input application voltage, the liquid crystal application voltage representing a voltage actually applied to the liquid crystal elements, the input application voltage representing a voltage which corresponds to the input video signal, wherein the drive section performs a divisional-drive operation belonging to the first divisional-drive operation group such that the liquid crystal application voltage is higher than the input application voltage at least in an intermediate luminance range, whereas in a highlight luminance range, the liquid crystal application voltage is equal to or higher than the input application voltage but is still lower than a voltage at which variation of azimuth angle of liquid crystal occurs, and the drive section performs a divisional-drive operation belonging to the second divisional-drive operation group such that the liquid crystal application voltage is lower than the input application voltage in the intermediate luminance range, whereas in a lowermost luminance range, the liquid crystal application voltage is equal to or lower than the input application voltage but is still higher than a voltage at which rebounding occurs.

2. The liquid crystal display device according to claim 1, wherein the drive section performs the divisional-drive operation belonging to the second divisional-drive operation group such that the liquid crystal application voltage is higher than a minimum voltage, which corresponds to a minimum gray-scale luminance level in the input video signal, at gray-scale luminance levels other than the minimum gray-scale luminance level within the lowermost luminance range.

3. The liquid crystal display device according to claim 1 or 2, wherein each of the pixels is configured of one or more first sub-pixels used for an operation belonging to the first divisional-drive operation group and one or more second sub-pixels used for an operation belonging to the second divisional-drive operation group, and the drive section implements a space-divisional drive on each of the pixels through separately performing the display drive operation on each of the first and second sub-pixels, based on the input video signal.

4. The liquid crystal display device according to claim 3, wherein the drive section implements the space-divisional drive on each of the pixels using of a LUT (Lookup Table) which provides a correlation between the input application voltage and the liquid crystal application voltage applied to the first sub-pixel, and a correlation between the input application voltage and the liquid crystal application voltage applied to the second sub-pixel.

5. The liquid crystal display device according to claim 3, wherein the drive section implements a space-divisional drive on each of the pixels using a reference voltage in a D/A (Digital/Analog) conversion for the first sub-pixel to be different than a reference voltage in a D/A conversion for the second sub-pixel, the reference voltages being used in the respective D/A conversions from the input application voltage into the liquid crystal application voltage.

6. The liquid crystal display device according to claim 1, wherein a unit frame period for the drive operation for execution to each of the pixels for display includes one or more first sub-frame periods used for an operation belonging to the first divisional-drive operation group, and one or more second sub-frame periods used for an operation belonging to the second divisional-drive operation group, and the drive section implements a time divisional drive on each of the pixels by separately performing display-drive in each of the first sub-frame period and the second sub-frame period based on the input video signal.

7. The liquid crystal display device according to claim 6, wherein the drive section implements the time-divisional drive on each of the pixels using a LUT (Lookup Table) which provides a correlation between the input application voltage and the liquid crystal application voltage applied to the pixel in the first sub-frame period, and a correlation between the input application voltage and the liquid crystal application voltage applied to the pixel in the second sub-frame period.

8. The liquid crystal display device according to claim 6, wherein the drive section implements the time-divisional drive on each of the pixels through a reference voltage in a D/A (Digital/Analog) conversion executed in the first sub-frame period that is different than a reference voltage in a D/A conversion executed in the second sub-frame period, the reference voltages being used in the respective D/A conversions from the input application voltage into the liquid crystal application voltage.

9. A liquid crystal display device, comprising:

a plurality of pixels arranged in a matrix, each one of the plurality of pixels being provided with a respective liquid crystal element made of a liquid crystal of a vertical alignment (VA) mode; and a drive section driving the respective liquid crystal element of each of the pixels for display by applying a voltage based on an input video signal to the liquid crystal element, the drive section performing a divisional-drive operation by space-divisionally or time-divisionally dividing a display drive operation on each of the pixels into a plurality based on the input video signal so that the divisional-drive operation includes a first divisional-drive operation group and a second divisional-drive operation group, the first divisional-drive operation group allowing a liquid crystal application voltage to be a higher-side voltage which is equal to or higher than an input application voltage, and a second divisional-drive operation group allowing the liquid crystal application voltage to be a lower-side voltage which is equal to or lower than the input application voltage, the liquid crystal application voltage representing a voltage actually applied to the liquid crystal elements, the input application voltage representing a voltage which corresponds to the input video signal, wherein the drive section performs a divisional-drive operation belonging to the first divisional-drive operation group such that the liquid crystal application voltage is higher than the input application voltage at least in an intermediate luminance range, whereas in a highlight luminance range, the liquid crystal application voltage is equal to or higher than the input application voltage but is still lower than a voltage at which variation of azimuth angle of liquid crystal occurs.

10. A liquid crystal display device, comprising:

a plurality of pixels arranged in a matrix, each one of the plurality of pixels being provided with a respective liquid crystal element made of a liquid crystal of a vertical alignment (VA) mode; and a drive section driving the respective liquid crystal element of each of the pixels for display by applying a voltage based on an input video signal to the liquid crystal element, the drive section performing a divisional-drive operation by space-divisionally or time-divisionally dividing a display drive operation on each of the pixels into a plurality based on the input video signal so that the divisional-drive operation includes a first divisional-drive operation group and a second divisional-drive operation group, the first divisional-drive operation group allowing a liquid crystal application voltage to be a higher-side voltage which is equal to or higher than an input application voltage, and a second divisional-drive operation group allowing the liquid crystal application voltage to be a lower-side voltage which is equal to or lower than the input application voltage, the liquid crystal application voltage representing a voltage actually applied to the liquid crystal elements, the input application voltage representing a voltage which corresponds to the input video signal, wherein the drive section performs a divisional-drive operation belonging to the second divisional-drive operation group such that the liquid crystal application voltage is lower than the input application voltage in the intermediate luminance range, whereas in a lowermost luminance range, the liquid crystal application voltage is equal to or lower than the input application voltage but is still higher than a voltage at which rebounding occurs.

* * * * *